(12) United States Patent
Lizzi et al.

(10) Patent No.: US 7,359,959 B2
(45) Date of Patent: *Apr. 15, 2008

(54) METHOD AND APPARATUS FOR USING A USB CABLE AS A CLUSTER QUORUM DEVICE

(75) Inventors: Christophe Lizzi, Meylan (FR); Laurent Faipot, Theys (FR); Jean-Pascal Mazzilli, Eybens (FR)

(73) Assignee: Sun Microsystems, Inc., Santa Clara, CA (US)

( * ) Notice: Subject to any disclaimer, the term of this patent is extended or adjusted under 35 U.S.C. 154(b) by 400 days.

This patent is subject to a terminal disclaimer.

(21) Appl. No.: 11/029,709

(22) Filed: Jan. 5, 2005

(65) Prior Publication Data

US 2006/0041778 A1   Feb. 23, 2006

(30) Foreign Application Priority Data

Aug. 23, 2004   (EP) ................... 04292072

(51) Int. Cl.
*G06F 15/177* (2006.01)
(52) U.S. Cl. ..................... 709/221; 710/110
(58) Field of Classification Search ............... 709/221; 710/110
See application file for complete search history.

(56) References Cited

U.S. PATENT DOCUMENTS

| 4,380,798 | A | * | 4/1983 | Shannon et al. ............ 710/241 |
| 4,470,112 | A | | 9/1984 | Dimmick |
| 4,644,496 | A | * | 2/1987 | Andrews ..................... 712/13 |
| 4,754,398 | A | * | 6/1988 | Pribnow ..................... 709/226 |
| 4,785,394 | A | * | 11/1988 | Fischer ....................... 710/114 |
| 4,818,985 | A | | 4/1989 | Ikeda et al. |
| 5,381,415 | A | | 1/1995 | Mizutani et al. |
| 5,596,754 | A | | 1/1997 | Lomet |
| 5,664,092 | A | * | 9/1997 | Waites ......................... 714/25 |
| 5,671,407 | A | | 9/1997 | Demers et al. |
| 5,673,384 | A | | 9/1997 | Hepner et al. |

(Continued)

FOREIGN PATENT DOCUMENTS

EP        712076 A2 *   5/1996

(Continued)

OTHER PUBLICATIONS

IEEE 100 The Authoritative Dictionary of IEEE Standards Terms, seventh edition, Dec. 2000, Definition of Cable.*

(Continued)

*Primary Examiner*—Paul R. Myers
(74) *Attorney, Agent, or Firm*—Osha Liang LLP

(57) ABSTRACT

A method for obtaining a quorum vote by a first node using a Universal Serial Bus (USB) quorum cable, wherein the USB quorum cable comprises a first end connected to a first node and a second end connected to a second node, including determining whether the USB quorum cable is reserved by the second node by querying a memory located in the USB quorum cable, if the USB quorum cable is not reserved by the second node attempting to reserve the USB quorum cable, determining whether the attempt to reserve the USB quorum cable was successful, and obtaining the quorum vote by the first node, if the attempt to reserve the USB quorum cable is successful.

10 Claims, 4 Drawing Sheets

U.S. PATENT DOCUMENTS

| | | | |
|---|---|---|---|
| 5,828,876 A | 10/1998 | Fish et al. | |
| 5,828,889 A * | 10/1998 | Moiin et al. | 710/240 |
| 5,918,244 A | 6/1999 | Percival et al. | |
| 5,948,109 A | 9/1999 | Moiin et al. | |
| 6,032,216 A | 2/2000 | Schmuck et al. | |
| 6,098,120 A * | 8/2000 | Yaotani | 710/16 |
| 6,105,099 A | 8/2000 | Freitas et al. | |
| 6,108,699 A * | 8/2000 | Moiin | 709/221 |
| 6,243,744 B1 | 6/2001 | Snaman, Jr. et al. | |
| 6,279,032 B1 * | 8/2001 | Short et al. | 709/209 |
| 6,308,215 B1 * | 10/2001 | Kolbet et al. | 709/233 |
| 6,330,656 B1 | 12/2001 | Bealkowski et al. | |
| 6,363,449 B1 | 3/2002 | Sides et al. | |
| 6,487,622 B1 * | 11/2002 | Coskrey et al. | 710/241 |
| 6,496,914 B1 | 12/2002 | Vook et al. | |
| 6,523,078 B1 | 2/2003 | Desai | |
| 6,615,256 B1 * | 9/2003 | van Ingen et al. | 709/220 |
| 6,622,195 B2 * | 9/2003 | Osakada et al. | 710/316 |
| 6,651,136 B2 | 11/2003 | Percival et al. | |
| 6,774,604 B2 | 8/2004 | Matsuda et al. | |
| 6,823,356 B1 | 11/2004 | Novaes et al. | |
| 6,965,957 B1 | 11/2005 | Nguyen | |
| 6,985,956 B2 | 1/2006 | Luke et al. | |
| 6,986,015 B2 | 1/2006 | Testardi | |
| 7,016,946 B2 * | 3/2006 | Shirriff | 709/221 |
| 7,089,293 B2 | 8/2006 | Grosner et al. | |
| 7,155,524 B1 | 12/2006 | Reiter et al. | |
| 2004/0123053 A1 | 6/2004 | Karr et al. | |
| 2005/0172073 A1 | 8/2005 | Voigt et al. | |
| 2006/0129556 A1 | 6/2006 | Reuter | |

FOREIGN PATENT DOCUMENTS

| | | |
|---|---|---|
| EP | 953903 A2 * | 11/1999 |
| EP | 1 117 042 A | 7/2001 |
| EP | 1 274 012 A | 1/2003 |
| WO | WO 2004068650 A1 * | 8/2004 |

OTHER PUBLICATIONS

Dictionary of Computers, Information Processing & Telecommunications, Second edition, 1987, Definition of Cable.*
European Search Report dated Feb. 4, 2005 (3 pages).
European Search Report dated Feb. 4, 2005 (1 page).

* cited by examiner

METHOD AND APPARATUS FOR USING A USB CABLE AS A CLUSTER QUORUM DEVICE

BACKGROUND

A cluster typically refers to a service delivery platform that includes a tightly coupled group of servers (i.e., nodes), storage devices, and software. Each node in the cluster is interconnected to at least one other node in the cluster. The nodes in the cluster are configured such that the cluster as a whole provides the ability to run failover, parallel, and/or scalable resources. Thus, clusters are useful for industries that require high availability of applications and services (e.g., telecommunications industry).

Further, each node is associated with a cluster and is configured to join the cluster it is associated with when the node is booted. However, if the cluster to which the node is configured to join is not present when the node is booted, then the node may attempt to create the specific cluster to which it is configured to join. In some situations, the cluster to which the node is to join is present but due to a communications failure between the node and the cluster, the node is not able to join the cluster and, thus, attempts to create the cluster. In this situation, the cluster may become partitioned resulting in multiple instances of the same cluster being created and executed. The operation of two instances of cluster is commonly referred to as "split-brain" and may result in data corruption, etc.

To solve the aforementioned problem, a node may only create a cluster if the node obtains a sufficient number of quorum votes to obtain a quorum. The quorum refers to the minimum number of quorum votes required to create a cluster, which is typically half the number of nodes in the cluster plus one. Further, each node in the cluster typically has one quorum vote. Thus, if a node attempting to form the cluster is connected to at least half of the other nodes in the cluster, then a quorum is reached and the cluster created.

While the aforementioned scheme is adequate for clusters containing a relatively large number of nodes, the scheme is not appropriate for two-node clusters or clusters that may easily degenerate into two-node clusters. For a two-node cluster, the quorum votes required for a two-node cluster is 2 (i.e., 2 (number of nodes in cluster)/2 +1).) Therefore, in the case of two-node clusters, if one node fails, then the remaining operational node is not able to create a cluster because the remaining operation node will never be able to obtain a quorum of 2.

The aforementioned scheme has been modified to address two-node clusters. Specifically, a quorum device is connected to the cluster such that each node in the cluster is able to communicate with the quorum device. The purpose of the quorum device is to provide an additional quorum vote. Thus, the quorum vote provided by the quorum device allows a single node in the two-node cluster to create a cluster in the event that the other node is not operational or experiencing communication difficulty. More specifically, each node in the two-node cluster includes functionality to reserve the quorum device, and thereby obtain the quorum vote associated with the quorum device. The ability to reserve the quorum device also provides a means for indicating, to the other node in the two-node cluster, that the quorum vote associated with the quorum device is in use, thereby preventing the node that does not have the quorum vote associated with the quorum device from creating a new cluster.

Quorum devices are typically shared storage devices (such as SCSI disks) and are referred to a quorum disks. The quorum disk is connected to all nodes that have a potential of joining the cluster. The use of a quorum disk typically requires that the nodes in the cluster have the appropriate hardware and software for interacting with the quorum disk.

SUMMARY

In general, in one aspect, the invention relates to a method for obtaining a quorum vote by a first node using a Universal Serial Bus (USB) quorum cable (121), wherein the USB quorum cable (121) comprises a first end (123) connected to a first node (100) and a second end (125) connected to a second node (102), comprising determining whether the USB quorum cable (121) is reserved by the second node (102) by querying a memory (126) located in the USB quorum cable (121), if the USB quorum cable (121) is not reserved by the second node (102): attempting to reserve the USB quorum cable (121), determining whether the attempt to reserve the USB quorum cable (121) was successful, and obtaining the quorum vote by the first node (100), if the attempt to reserve the USB quorum cable (121) is successful. Further, in general, in one aspect, the read request is processed by a microprocessor (124) located in the USB quorum cable (121).

In general, in one aspect, the invention relates to a cluster comprising a Universal Serial Bus (USB) quorum cable (121) having a first end (123) and a second end (125), a first node (100) connected to the first end (123), and a second node (102) connected to the second end (125), wherein the first node (100) and the second node (102) comprise functionality to reserve the USB quorum cable (121), thereby obtaining a quorum vote. Further, in general, in one aspect, the memory (126) is an EEPROM, and a read request is processed by a microprocessor (124) located in the USB quorum cable (121)

In general, in one aspect, the invention relates to a cluster comprising: a Universal Serial Bus (USB) quorum cable (121) having a first end (100) and a second end (102), wherein the USB quorum cable (121) comprises a memory (126) configured to store a reservation state of the USB quorum cable (121), a first node (100) connected to the first end (123), and a second node (102) connected to the second end (125), wherein the first node (100) and the second node (102) comprise functionality to reserve the USB quorum cable (121) using the reservation state, thereby obtaining a quorum vote.

In general, in one aspect, the invention relates to a cluster, wherein the USB quorum cable further comprises a first first-in-first-out (FIFO) queue associated with the first node (100), and a second FIFO queue associated with the second node (102), wherein the first node (100) uses the first FIFO queue to determine whether the USB quorum cable (121) is reserved, and wherein the second node (102) uses the second FIFO queue to determine whether the USB quorum cable (121) is reserved. Further, in general, in one aspect, the memory (126) is an EEPROM.

Other aspects of the invention will be apparent from the following description and the appended claims.

DETAILED DESCRIPTION

Figure 1:
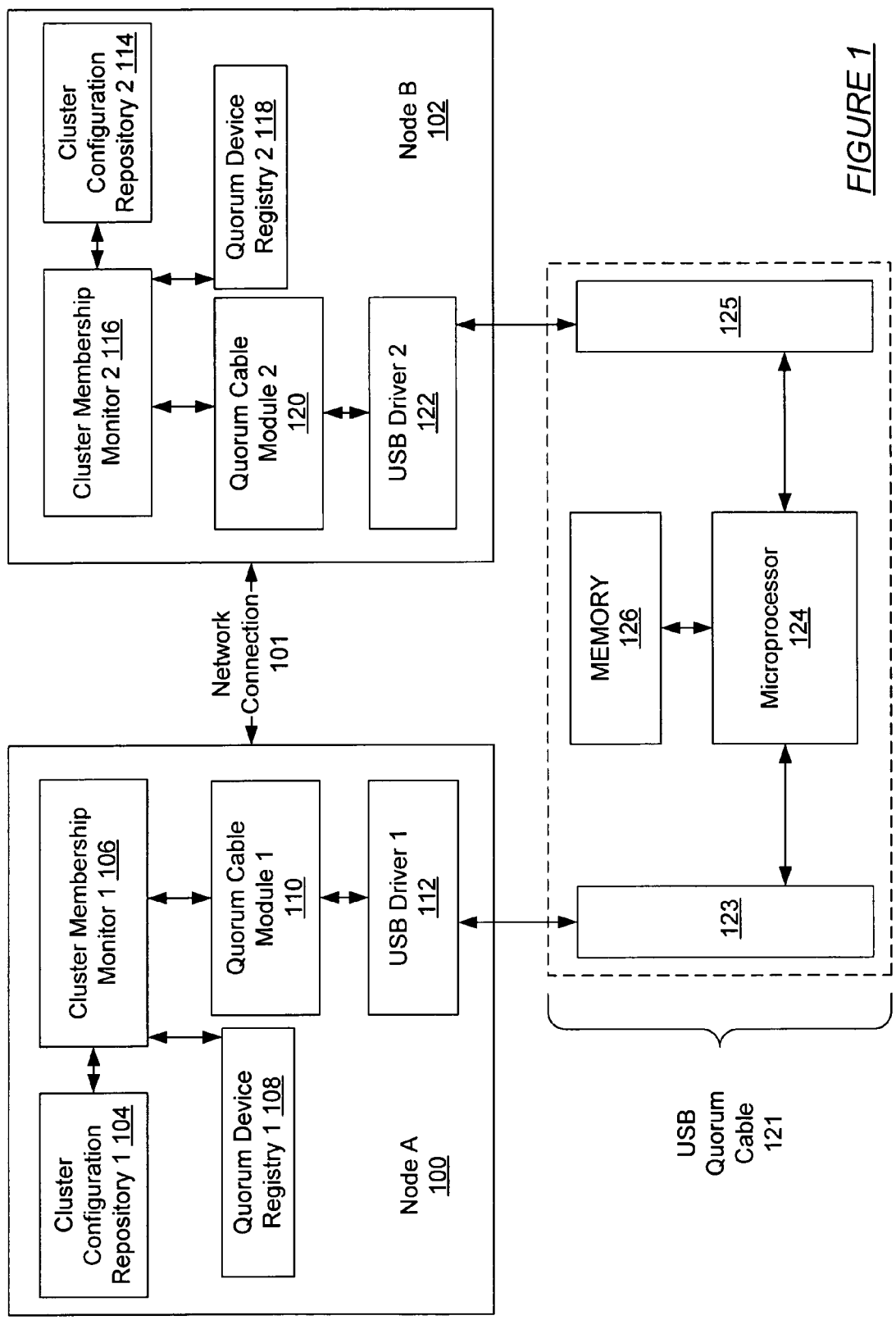
FIG. 1 shows a cluster in accordance with one embodiment of the invention.

Exemplary embodiments of the invention will be described with reference to the accompanying drawings. Like items in the drawings are shown with the same reference numbers.

In the following description, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for using a Universal Serial Bus (USB) quorum cable. More specifically, embodiments of the invention provide a method and apparatus to use a USB quorum cable in a two-node cluster or a cluster that may degenerate to a two-node cluster. Further, embodiments of the invention provide a method and apparatus for using USB quorum cable to provide a quorum vote to one node in the cluster, thereby enabling creation of a cluster. In addition, embodiments of the invention provide a USB quorum cable that requires a minimal amount of hardware and software to operate, thereby enabling nodes with minimal amounts of external interfaces and limited resources to be used in clusters.

FIG. 1 shows a cluster in accordance with one embodiment of the invention. The cluster shown in FIG. 1 includes two nodes: Node A (100) and Node B (102). Though not shown in FIG. 1, each node (i.e., Node A (100) and Node B (102)) includes at least a processor, memory (e.g., random access memory (RAM), read-only memory (ROM), etc.), and a network interface. Further, each node (i.e., Node A (100) and Node B (102)) is connected to at least one other node in the cluster by some form of network connection (e.g., network connection (101)). As shown in FIG. 1, each node (i.e., Node A (100), Node B (102)) includes a cluster membership monitor (CMM) (CMM 1 (106), CMM 2 (116)), a cluster configuration repository (CCR) (CRR 1 (104), CRR 2 (114)), a quorum device registry (QDR) (QDR 1 (108), QDR 2 (118)), a quorum cable module (QCM) (QCM 1 (110), QCM 2 (120)), and a USB driver (USB Driver 1 (112), USB Driver 2 (122)). Each of the aforementioned components is described in detail below.

In one embodiment of the invention, the CMM (CMM 1 (106), CMM 2 (116)) includes software that maintains a consistent cluster membership list (i.e., maintains a list of the current nodes in the cluster). The cluster membership list maintained by the CMM (CMM 1 (106), CMM 2 (116)) is used to configure and manage the cluster. Further, the CMM (CMM 1 (106), CMM 2 (116)) includes functionality to ensure that non-cluster members (i.e., nodes that are not members of the cluster) cannot corrupt data and transmit corrupt or inconsistent data to clients using services provided by the cluster. In addition, the CMM (CMM 1 (106), CMM 2 (116)) includes functionality to obtain quorum votes, create a cluster if there are a sufficient number of quorum votes, and prevent the creation of multiple instances of the same cluster.

Further, the CMM (CMM 1 (106), CMM 2 (116)) includes functionality to interface with the CCR (CCR 1 (104), CCR 2 (114)), the QDR (QDR 1 (108), QDR 2 (118)), and the QCM (QCM 1 (110), QCM 2 (120)). In one embodiment of the invention, the CCR (CCR 1 (104), CCR 2 (114)) is a highly available, replicated data store (e.g., one CCR per node) that is configured to persistently store cluster configuration information (e.g., node names, listing of quorum devices, etc.). In one embodiment of the invention, the QDR (QDR 1 (108), QDR 2 (118)) maintains a list of all the quorum devices (e.g., USB quorum cable (121), etc.) connected to the cluster. In one embodiment of the invention, the QCM (QCM 1 (110), QCM 2 (120)) is configured to provide an interface between the USB quorum cable (121) (via the USB Driver) and the CMM (CCM 1 (106), CMM 2 (116)). In particular, the QCM (QCM 1 (110), QCM 2 (120)) provides a layer of abstraction between the USB quorum cable (121) and the CMM (CCM 1 (106), CMM 2 (116)).

More specifically, when the QCM (QCM 1 (110), QCM 2 (120)) receives commands/data from the CMM (CCM 1 (106), CMM 2 (116)), the QCM (QCM 1 (110), QCM 2 (120)) converts the commands/translates data into a form that may be interpreted by the USB Driver (USB Driver 1 (112), USB Driver 2 (122)). The USB Driver (USB Driver 1 (112), USB Driver 2 (122)), which includes device specific functionality to interact with the USB quorum cable (121), subsequently forwards the converted commands/translated data to the USB quorum cable (121). The USB Driver (USB Driver 1 (112), USB Driver 2 (122)) also includes functionality to receive data from the USB quorum cable (121).

In one embodiment of the invention, USB quorum cable (121) includes two ends (123, 125). The ends (123, 125) of the USB quorum cable (121) are physically connected to Node A (100) and Node B (102), respectively. Further, the USB quorum cable (121) also includes a microprocessor (124) and a memory (126). In one embodiment of the invention, the microprocessor (124) includes functionality to process commands received from Node A (100) and Node B (102). More specifically, in one embodiment of the invention, the microprocessor (124) is configured to receive commands to read the status of the USB quorum cable (121) stored in the memory (126). Further, the microprocessor (124) is configured to update/change the status of the USB quorum cable (121) by writing the appropriate value into the memory (126), thereby reserving the USB quorum cable (121) or changing the node that is currently reserving the USB quorum cable (121).

As noted above, in one embodiment of the invention, the memory (126) is configured to store the status of the USB quorum cable (121). More specifically, in one embodiment of the invention, the memory (126) is configured to store a value associated with the node that currently has reserved the USB quorum cable (121), for example, the memory (126) may store the name of the node, a reservation key associated with the node, an alpha-numeric key that uniquely identifies the node, etc. Thus, when the memory (126) (or a portion of the memory that is configured to store the status of the USB quorum cable (121)) contains a value associated with the node, then the USB quorum cable is reserved by the corresponding node. Alternatively, if the memory (126) (or a portion of the memory that is configured to store the status of the USB quorum cable (121)) is empty (i.e., has a zero, NULL, or an equivalent value that indicates the USB quorum cable (121) is not reserved), then the USB quorum cable (121) is not reserved.

Those skilled in the art will appreciate that situations exist in which the node that had previously reserved the USB quorum cable (121) has failed, however, the status of the USB quorum cable (121) still reflects that the USB quorum cable (121) is reserved by the failed node. In this (or similar situations) the CMM (i.e., CMM 1 (106), CMM 2 (114)) (or a related process) includes functionality to preempt the reservation of USB quorum cable (121) by the failed node, and allow any operational node of the cluster to reserve the USB quorum cable (121).

In one embodiment of the invention, the memory is an electrically erasable programmable read-only memory (EE-PROM). Further, in one embodiment of the invention, Node A (100) and Node B (102) issue commands and receive responses from the microprocessor (124) via First-In-First-Out (FIFO) queues. Though not shown in FIG. 1, a FIFO queue may exist for each node (i.e., Node A (100) and Node B (102)). Those skilled in the art will appreciate that while the aforementioned invention has been described using a host-to-host USB quorum cable having a microprocessor and a memory embedded within the cable, the invention may be extended to operate using any host-to-host USB cable that includes memory and is accessible by both nodes in the cluster, and large enough to store the status of the USB quorum cable (121). Thus, microprocessor and the memory do not have to be integrated within the USB quorum cable, but rather may be operatively connected to the USB quorum cable (121).

Figure 2:
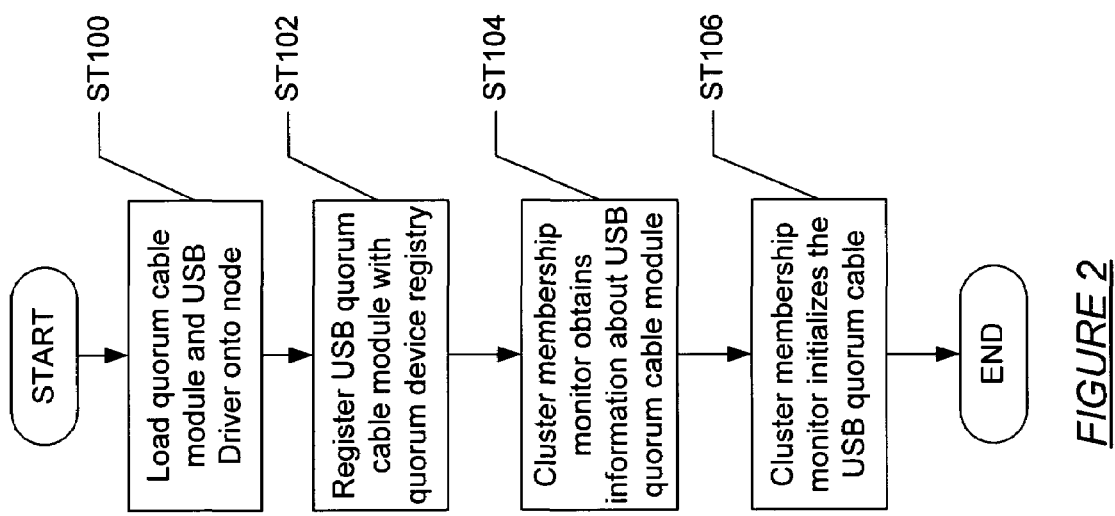
FIGS. 2 and 3 show flowcharts in accordance with one embodiment of the invention.

FIG. 2 shows a flowchart in accordance with one embodiment of the invention. More specifically, FIG. 2 shows a method for initializing a node in the cluster to use the USB quorum cable. Initially, a QCM and a USB Driver are loaded on to the node (ST 100). Those skilled in the art will appreciate the other components shown in FIG. 1 (i.e., the CCR, the QDR, and the CMM) are already loaded onto the node. The QCM is subsequently registered with the QDR, thereby indicating to the CMM that the QCM is available to use on the node (ST 102). The CMM, upon discovering that the QCM is available to use on the node, obtains configuration information about the QCM (i.e., information about the QCM which includes information about the USB quorum cable) (ST 104). Once the CMM has obtained the necessary information, the CMM issues the appropriate commands to initialize the USB quorum cable (and the QCM, as necessary) (ST 106).

The aforementioned method is repeated for each node the USB quorum cable is connected to (or is or to which the USB quorum cable is planned to be connected). Once the aforementioned method has been performed on the appropriate nodes and the USB quorum cable is physically connected to the nodes, the cluster (or more specifically the nodes in the cluster) may now reserve the USB quorum cable and obtain quorum votes (as needed) to form a cluster.

Figure 3:
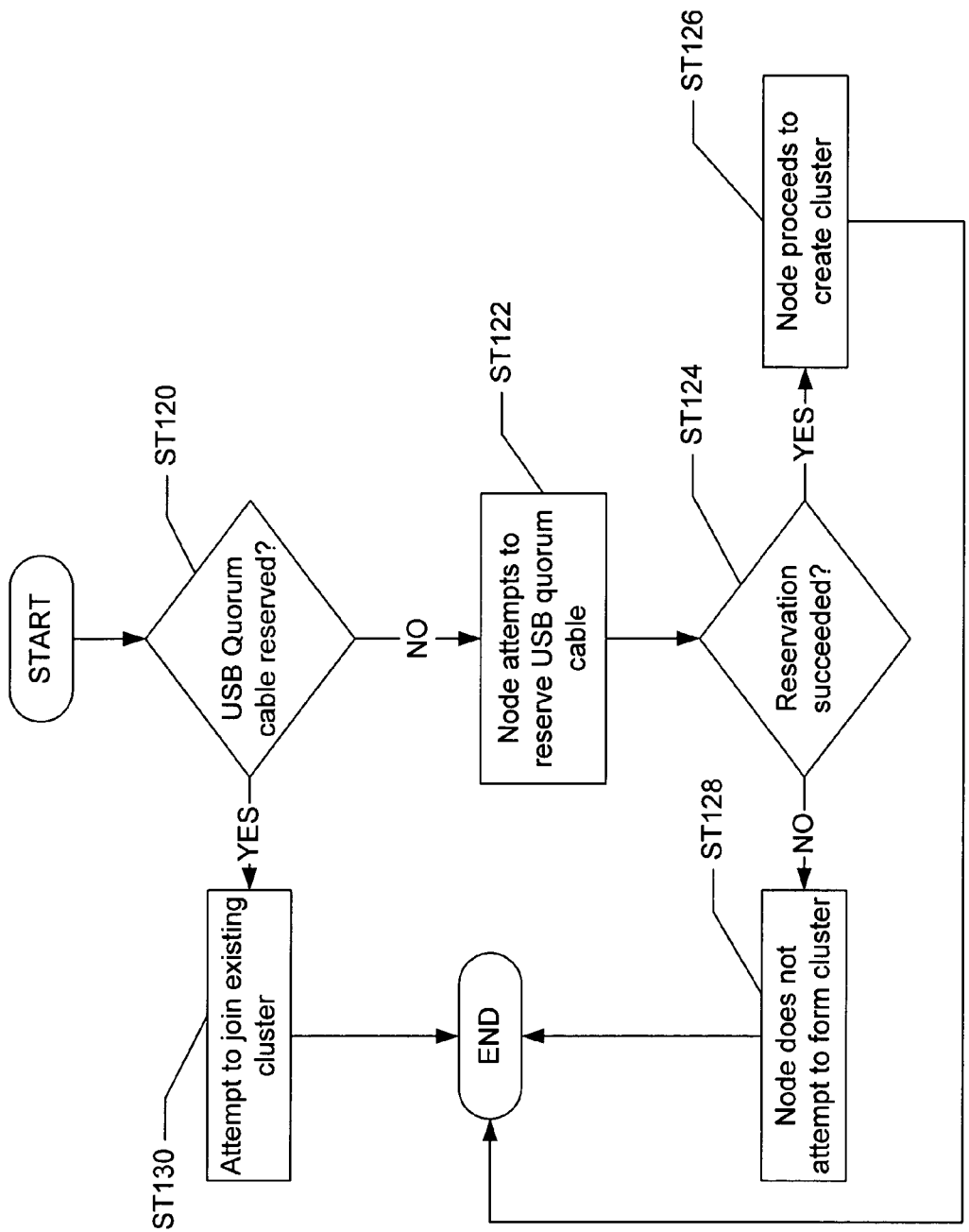

FIG. 3 shows a flowchart for a method of reserving the USB quorum cable and thereby obtaining a quorum vote, in accordance with one embodiment of the invention. Those skilled in the art will appreciate that the following method is performed only as required by the clustering software. More specifically, the following method is performed whenever a need exists to obtain a quorum and there are not sufficient quorum votes from the nodes in the cluster to form a quorum. As discussed above, such scenarios commonly occur when communication failures occur between nodes in the cluster.

Once a node in the cluster determines that the quorum cable must be used to obtain a quorum vote, the node determines whether the quorum cable is currently reserved (ST120). In one embodiment of the invention, the node (under control of the CMM) sends a request to the microprocessor in the USB quorum cable to determine the status of the USB quorum cable (i.e., which node, if any, has currently reserved the USB quorum cable). The microprocessor receives the response and subsequently queries the memory within the USB quorum cable to obtain the status of the USB quorum cable. As noted above, the status of the USB quorum cable may be, for example, the unique identifier of the node that has currently reserved the USB quorum cable.

Once the microprocessor has retrieved the status of the USB quorum cable and forwarded it to the node attempting to reserve the USB quorum cable, the node analyzes the status of the USB quorum cable to determine whether the node can proceed to reserve the USB quorum cable. In the simplest case, the status of the USB quorum cable reflects that the USB quorum cable is not reserved and, thus, the node proceeds to attempt to reserve the USB quorum cable (ST122). Alternatively, the status of the USB quorum cable may indicate that the USB quorum cable is currently reserved by an active node in the cluster, and thus the node attempting to reserve the quorum cable does not attempt to reserve the cable and proceeds to attempt to join the existing cluster (ST130).

Further, in some instances the status of the USB quorum cable may indicate that the USB quorum cable is currently reserved, however, the node that is currently holding the reservation of the USB quorum cable is not active, for example, due to failure of the node. In such cases, the node attempting to reserve the USB quorum module may (via the CMM) preempt the reservation of the USB quorum cable and proceed to attempt to reserve the USB quorum cable (ST122).

Once a determination is made that the USB quorum cable may be reserved, the node attempting to reserve the USB quorum cable proceeds to attempt to reserve the quorum cable (ST122). In one embodiment of the invention, the node attempts to reserve the quorum cable by issuing a command to the microprocessor in the USB quorum cable (via the corresponding USB Driver and FIFO queue) to change the status of the USB quorum cable to reflect that the node has reserved the USB quorum cable.

Once the node has sent the command to reserve the USB quorum cable, the node waits to receive confirmation that the reservation has succeeded (ST124). In one embodiment of the invention, the microprocessor in the USB quorum cable sends an acknowledgement of a successful reservation of the USB quorum cable to the node. If a successful reservation did not occur, for example, because another node in the cluster reserved the USB quorum cable, because the USB quorum cable is damaged, etc., then the node has not reserved the USB quorum cable, and does not attempt to create a cluster (ST128). Alternatively, if the node receives an indication that the reservation of the USB quorum cable is successful, then the node proceeds to create the cluster (ST126). At this stage, the node that reserved the USB quorum cable has a sufficient number of quorum votes (i.e., 2 quorum votes) to create the cluster. Thus, the node (via the CMM) may proceed to create the cluster.

Figure 4:
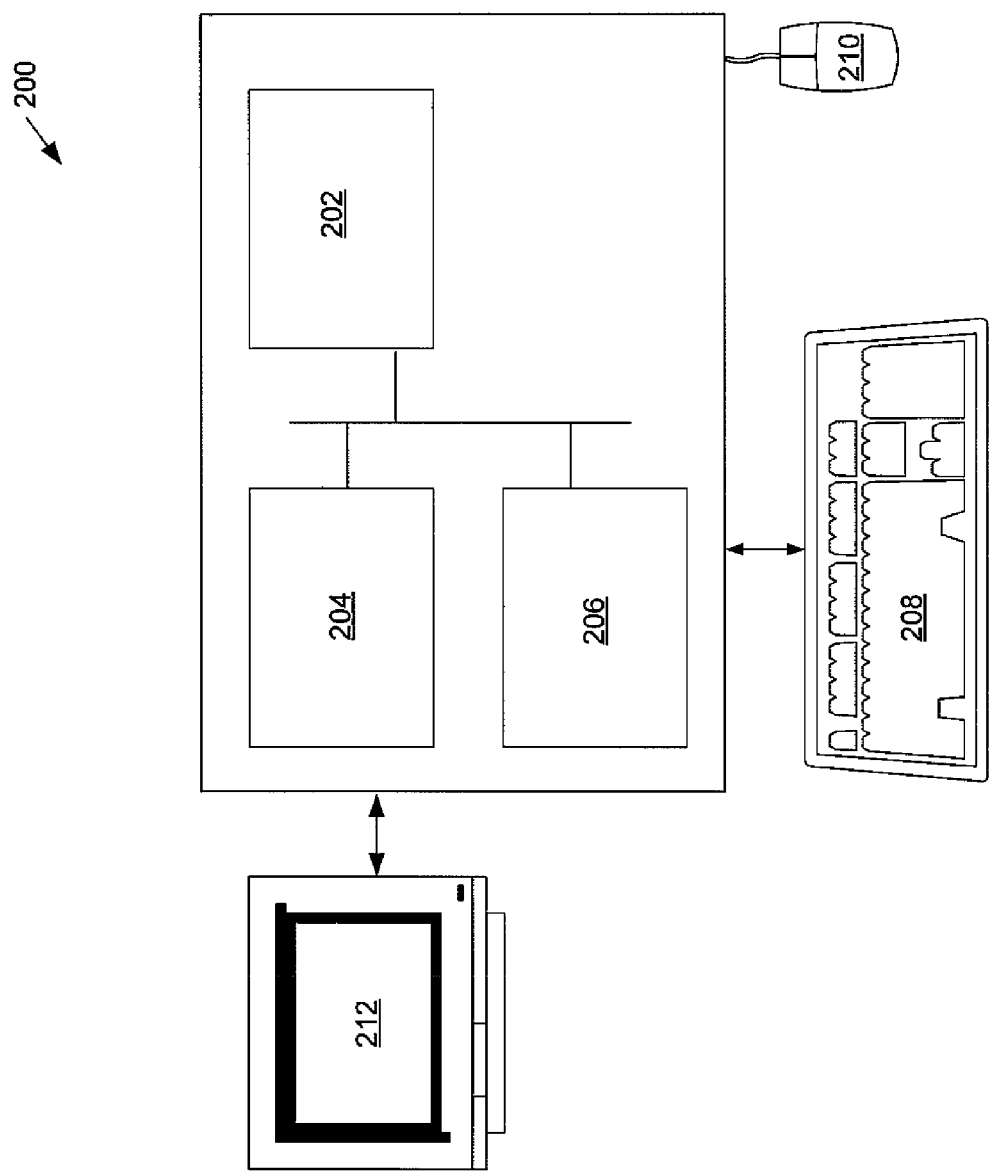
FIG. 4 shows a computer system in accordance with one embodiment of the invention.

The term "nodes" used to describe the invention corresponds to virtually any type of computer running any type of platform. For example, as shown in FIG. 4, a computer system (200) includes a processor (202), associated memory (204), a storage device (206), and numerous other elements and functionalities typical of today's computers (not shown). The computer (200) may also include input means, such as a keyboard (208) and a mouse (210), and output means, such as a monitor (212). The computer system (200) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (200) may be located at a remote location and connected to the other elements over a network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for obtaining a quorum vote comprising:
   determining that a network connection between a first node and a second node is inactive, wherein the network connection is associated with a local area network;
   determining, by the first node, whether a Universal Serial Bus (USB) quorum cable is reserved by the second node by querying a memory embedded in the USB quorum cable, wherein the USB quorum cable comprises a first end connected to the first node and a second end connected to the second node; and
   if the USB quorum cable is not reserved by the second node, the first node:
      attempting to reserve the USB quorum cable;
      determining whether the attempt to reserve the USB quorum cable was successful; and
      obtaining the quorum vote if the attempt to reserve the USB quorum cable is successful, wherein the quorum vote is obtained without direct communication between the first node and the second node,
      attempting to create a cluster using the quorum vote, wherein the cluster comprises the first node.

2. The method of claim 1, wherein determining whether the USB quorum cable is reserved by the second node comprises:
   sending a read request to the memory located in the USB quorum cable to obtain a status of the USB quorum cable.

3. The method of claim 2, wherein the memory is an EEPROM.

4. The method of claim 2, wherein the read request is communicated to the USB quorum cable using a first-in-first-out queue located in the USB quorum cable and operatively connected to the first node.

5. The method of claim 1, wherein the attempt to reserve the USB quorum cable is successful if a stats of the USB quorum cable indicates that the first node has reserved the USB quorum cable.

6. A cluster comprising:
   a Universal Serial Bus (USB) quorum cable having a first end and a second end;
   a first node connected to the first end; and
   a second node connected to the second end,
   wherein the first node and the second node are connected over a local area network;
   wherein the first node and the second node comprise functionality to reserve the USB quorum cable, thereby obtaining a quorum vote, wherein the quorum vote is obtained without direct communication between the first node and the second node, and
   wherein the USB quorum cable further comprises a memory that stores a status of the USB quorum cable,
   wherein the first node includes functionality to attempt to create the cluster when the first node reserves the quorum vote, wherein the cluster comprises the first node, and
   wherein the second node includes functionality to attempt to create the cluster when the second node reserves the quorum vote.

7. The cluster of claim 6, wherein functionality to reserve the USB quorum cable by the first node comprises functionality to:
   determine whether the USB quorum cable is reserved by the second node by querying the memory comprised in the USB quorum cable; and
   if the USB quorum cable is not reserved by the second node:
      attempt to reserve the USB quorum cable;
      determine whether the attempt to reserve the USB quorum cable was successful; and
      obtain the quorum vote by the first node, if the attempt to reserve the USB quorum cable is successful.

8. The cluster of claim 7, wherein determining whether the USB quorum cable is reserved by the second node comprises:
   sending a read request to the memory comprised in the USB quorum cable to obtain the status of the USB quorum cable.

9. The cluster of claim 8, wherein the read request is communicated to the USB quorum cable using a first-in-first-out queue located in the USB quorum cable and operatively connected to the first node.

10. The cluster of claim 9, wherein the attempt to reserve the USB quorum cable is successful if the status of the USB quorum cable indicates that the first node has reserved the USB quorum cable.

* * * * *